(12) United States Patent
Leedom, Jr.

(10) Patent No.: US 7,627,340 B2
(45) Date of Patent: *Dec. 1, 2009

(54) TIERED WIRELESS, MULTI-MODAL ACCESS SYSTEM AND METHOD

(75) Inventor: Charles M. Leedom, Jr., Falls Church, VA (US)

(73) Assignee: MLR, LLC, Palm Beach Garden, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/017,124

(22) Filed: Jan. 21, 2008

(65) Prior Publication Data

US 2008/0214231 A1 Sep. 4, 2008

Related U.S. Application Data

(60) Continuation of application No. 11/050,776, filed on Feb. 7, 2005, now Pat. No. 7,343,173, which is a division of application No. 09/813,165, filed on Mar. 21, 2001, now Pat. No. 6,961,584.

(60) Provisional application No. 60/191,121, filed on Mar. 22, 2000.

(51) Int. Cl.
*H04M 1/00* (2006.01)
(52) U.S. Cl. .............. 455/552.1; 455/443; 455/449; 370/338
(58) Field of Classification Search ........... 455/436, 455/443–445, 448, 449, 550.1, 552.1; 370/328, 370/338
See application file for complete search history.

(56) References Cited

U.S. PATENT DOCUMENTS 4,144,496 A 3/1979 Cunningham et al.
4,268,722 A 5/1981 Little et al.

(Continued)

FOREIGN PATENT DOCUMENTS

EP 0 268 375 A2 5/1988

(Continued)

OTHER PUBLICATIONS

European Patent Office First Action, EP 01 922 491.4 dated Nov. 29, 2005.

(Continued)

*Primary Examiner*—Nhan T Le
(74) *Attorney, Agent, or Firm*—Rothwell, Figg, Ernst & Manbeck, P.C.

(57) ABSTRACT

A wireless, multi-modal access device and system adapted to integrate a number of communications networks operating in differing communication modes to facilitate transfer of communication links during a communication session to promote efficient use of the communication networks. The system includes a plurality of Universal Multi-Modal Access Devices UMMAD that are capable of operating at different frequencies and different protocols (TDMA, AMPS, CDMA, GSM, PCS etc) to communicate with any one of a number of Wide Bandwidth Gateways (WBG), which are each capable of communication using one or more of the protocols. The communication links may be switched from one WBG to another or from one protocol to another during a communication session to continue the session under the control of a Universal System Traffic Controller. Numerous other applications of the UMMADs for unique identification and e-commerce are disclosed.

9 Claims, 3 Drawing Sheets

U.S. PATENT DOCUMENTS

| | | | |
|---|---|---|---|
| 4,302,845 A | 11/1981 | McClaughry et al. |
| 4,312,074 A | 1/1982 | Pautler et al. |
| 4,369,520 A | 1/1983 | Cerny, Jr. et al. |
| 4,371,751 A | 2/1983 | Hilligoss, Jr. et al. |
| 4,485,486 A | 11/1984 | Webb et al. |
| 4,558,453 A | 12/1985 | Mimken |
| 4,578,796 A | 3/1986 | Charalambous et al. |
| 4,654,879 A | 3/1987 | Goldman et al. |
| 4,741,018 A | 4/1988 | Potratz et al. |
| 4,741,049 A | 4/1988 | De Jager et al. |
| 4,799,253 A | 1/1989 | Stern et al. |
| 4,811,420 A | 3/1989 | Avis et al. |
| 4,833,727 A | 5/1989 | Calvet et al. |
| 4,866,431 A | 9/1989 | Andros et al. |
| 4,887,311 A | 12/1989 | Garner et al. |
| 4,905,301 A | 2/1990 | Krolopp et al. |
| 4,916,728 A | 4/1990 | Blair |
| 4,977,612 A | 12/1990 | Wilson |
| 4,985,904 A | 1/1991 | Ogawara |
| 4,989,230 A | 1/1991 | Gillig et al. |
| 5,008,925 A | 4/1991 | Pireh |
| 5,020,092 A | 5/1991 | Phillips et al. |
| 5,020,093 A | 5/1991 | Pireh |
| 5,020,094 A | 5/1991 | Rash et al. |
| 5,034,993 A | 7/1991 | Sasuta et al. |
| 5,077,834 A | 12/1991 | Andros et al. |
| 5,119,397 A | 6/1992 | Dahlin et al. |
| 5,121,115 A | 6/1992 | Andros et al. |
| 5,122,795 A | 6/1992 | Cubley et al. |
| 5,127,042 A | 6/1992 | Gillig et al. |
| 5,134,709 A | 7/1992 | Bi et al. |
| 5,159,625 A | 10/1992 | Zicker |
| 5,175,867 A | 12/1992 | Wejke et al. |
| 5,179,360 A | 1/1993 | Suzuki |
| 5,200,991 A | 4/1993 | Motoyanagi |
| 5,201,067 A | 4/1993 | Grube et al. |
| 5,210,785 A | 5/1993 | Sato et al. |
| 5,239,701 A | 8/1993 | Ishii |
| 5,249,302 A | 9/1993 | Metroka et al. |
| 5,260,988 A | 11/1993 | Schellinger et al. |
| 5,261,117 A | 11/1993 | Olson |
| 5,276,907 A | 1/1994 | Meidan |
| 5,293,628 A | 3/1994 | Langan et al. |
| 5,297,191 A | 3/1994 | Gerszberg |
| 5,301,359 A | 4/1994 | Van den Heuvel et al. |
| 5,309,503 A | 5/1994 | Bruckert et al. |
| 5,327,486 A | 7/1994 | Wolff et al. |
| 5,335,355 A | 8/1994 | Tanaka et al. |
| 5,343,341 A | 8/1994 | Jahren |
| 5,343,513 A | 8/1994 | Kay et al. |
| 5,345,448 A | 9/1994 | Keskitalo |
| 5,353,331 A | 10/1994 | Emery et al. |
| 5,365,571 A | 11/1994 | Rha et al. |
| 5,371,780 A | 12/1994 | Amitay |
| 5,406,615 A | 4/1995 | Miller, II et al. |
| 5,442,806 A | 8/1995 | Barber et al. |
| 5,475,735 A | 12/1995 | Williams et al. |
| 5,491,723 A | 2/1996 | Diepstraten |
| 5,509,035 A | 4/1996 | Teidemann, Jr. et al. |
| 5,517,491 A * | 5/1996 | Nanni et al. ............. 370/252 |
| 5,524,136 A | 6/1996 | Bar-Noy et al. |
| 5,550,895 A | 8/1996 | Burson et al. |
| 5,570,411 A | 10/1996 | Sicher |
| 5,574,973 A | 11/1996 | Borth et al. |
| 5,586,120 A * | 12/1996 | Cadd ..................... 370/468 |
| 5,590,172 A | 12/1996 | Lodwig et al. |
| 5,627,878 A | 5/1997 | Strauch et al. |
| 5,640,677 A | 6/1997 | Karlsson |
| 5,642,353 A | 6/1997 | Roy, III et al. |
| 5,649,308 A | 7/1997 | Andrews |
| 5,657,317 A | 8/1997 | Mahany et al. |
| 5,657,375 A | 8/1997 | Connolly et al. |
| 5,703,881 A | 12/1997 | Kay et al. |
| 5,724,647 A | 3/1998 | Sato et al. |
| 5,734,980 A | 3/1998 | Hooper et al. |
| 5,734,984 A | 3/1998 | Reece et al. |
| 5,745,523 A | 4/1998 | Dent et al. |
| 5,761,621 A | 6/1998 | Sainton |
| 5,778,024 A | 7/1998 | McDonough |
| 5,784,693 A | 7/1998 | Barber et al. |
| 5,793,843 A | 8/1998 | Morris |
| 5,796,727 A | 8/1998 | Harrison et al. |
| 5,802,483 A | 9/1998 | Morris |
| 5,802,502 A | 9/1998 | Gell et al. |
| 5,805,633 A | 9/1998 | Uddenfeldt |
| 5,809,395 A | 9/1998 | Hamilton-Piercy et al. |
| 5,812,955 A | 9/1998 | Dent et al. |
| 5,815,525 A | 9/1998 | Smith et al. |
| 5,854,985 A | 12/1998 | Sainton |
| 5,857,153 A | 1/1999 | Lupien |
| 5,875,186 A | 2/1999 | Belanger et al. |
| 5,903,832 A | 5/1999 | Seppanen et al. |
| 5,905,955 A | 5/1999 | Bamburak et al. |
| 5,940,761 A | 8/1999 | Tiedemann, Jr. et al. |
| 5,950,130 A | 9/1999 | Coursey |
| 5,966,667 A | 10/1999 | Halloran et al. |
| 5,974,319 A | 10/1999 | Kotzin et al. |
| 5,995,832 A | 11/1999 | Mallinckrodt |
| 6,002,918 A | 12/1999 | Heiman et al. |
| 6,006,105 A * | 12/1999 | Rostoker et al. ......... 455/552.1 |
| 6,011,975 A | 1/2000 | Emery et al. |
| 6,026,086 A * | 2/2000 | Lancelot et al. ............. 370/353 |
| 6,035,212 A * | 3/2000 | Rostoker et al. ......... 455/552.1 |
| 6,058,316 A | 5/2000 | Takahashi |
| 6,115,608 A | 9/2000 | Duran et al. |
| 6,128,490 A | 10/2000 | Shaheen et al. |
| 6,134,453 A | 10/2000 | Sainton et al. |
| 6,138,010 A * | 10/2000 | Rabe et al. ............... 455/426.1 |
| 6,148,197 A | 11/2000 | Bridges et al. |
| 6,185,413 B1 | 2/2001 | Mueller et al. |
| 6,192,255 B1 | 2/2001 | Lewis et al. |
| 6,230,010 B1 | 5/2001 | Morris |
| 6,249,686 B1 | 6/2001 | Dvorkin et al. |
| 6,298,235 B1 | 10/2001 | Bamburak et al. |
| 6,311,064 B1 | 10/2001 | Bamburak et al. |
| 6,314,163 B1 * | 11/2001 | Acampora .................. 379/56.2 |
| 6,418,318 B1 | 7/2002 | Bamburak et al. |
| 6,490,272 B1 | 12/2002 | Eriksson |
| 6,504,829 B1 * | 1/2003 | Young et al. ................. 370/337 |
| 6,564,071 B1 | 5/2003 | Bergins et al. |
| 6,771,961 B2 | 8/2004 | Bamburak et al. |
| 6,782,259 B2 | 8/2004 | Bamburak et al. |
| 6,847,822 B1 | 1/2005 | Dennison et al. |
| 6,934,558 B1 | 8/2005 | Sainton et al. |
| 6,954,470 B2 | 10/2005 | Paneth et al. |
| 6,961,584 B2 | 11/2005 | Leedom, Jr. |
| RE39,989 E | 1/2008 | Morris |
| 7,343,173 B2 * | 3/2008 | Leedom, Jr. ............. 455/552.1 |
| 7,346,350 B2 | 3/2008 | Bamburak et al. |
| 7,386,322 B2 | 6/2008 | Sainton et al. |

FOREIGN PATENT DOCUMENTS

| | | |
|---|---|---|
| EP | 0 369 535 A2 | 5/1990 |
| EP | 0 501 807 A2 | 9/1992 |
| EP | 0 504 807 A3 | 9/1992 |
| EP | 0 521 609 A2 | 1/1993 |
| GB | 2 120 049 A | 11/1983 |
| JP | 04-335723 | 11/1992 |
| WO | WO89/00370 | 1/1989 |
| WO | 90-13211 | 11/1990 |
| WO | WO 90-13211 A1 | 11/1990 |
| WO | WO92/04796 | 3/1992 |
| WO | WO 93/17505 A1 | 9/1993 |

| | | | |
|---|---|---|---|
| WO | WO 95/17077 A1 | 6/1995 | |
| WO | WO 95 33350 A | 12/1995 | |
| WO | WO 96 36192 A | 11/1996 | |
| WO | WO 97/09838 A1 | 3/1997 | |
| WO | WO 98 11750 A | 3/1998 | |

OTHER PUBLICATIONS

Stemm, M., et al., "Vertical Handoffs in Wireless Overlay Networks", Mobile Networks and Applications 3 (1998), pp. 335-350, XP-002982914.

Brewer E.A., et al., "A Network Architecture for Heterogeneous Mobile Computing," *IEEE Personal Communications, IEEE Communications Society, US*, vol. 5, No. 5, (1998), pp. 8-24, XP000786612.

Supplementary European Search Report, EP 01 92 2491.

International Search Report, PCT/US01/08881.

International Preliminary Examination Report, PCT/US01/08881.

European Application No. 01 922 491.4, Official Action dated Nov. 11, 2007; 5 pages.

Motorola, Inc.'s Answer and Affirmative Defenses to Count V of the Complaint, and Motorola's Counter-Claims filed on Sep. 30, 2008 in the U.S. district Court for the Eastern District of Va, in C.A. No. 2:08cv357 (HCM-FBS), 27 pp.

Motorola, Inc.'s Response to Interrogatories w/Exhibits A-E, 26 pages, dated Oct. 3, 2008.

Office Action issued in U.S. Appl. No. 11/047,665, on Sep. 19, 2007, 5 pages.

Supplemental Notice of Allowability in U.S. Appl. No. 09/670,696 dated Jan. 13, 2005, 4 pages.

Notice of Allowability in U.S. Appl. No. 09/670,696, dated Apr. 6, 2005, 3 pages.

Castro, "Handoff Techniques in Universal Mobile Communications", ICUPC '93 Conference Record, Aug. 1993, pp. 844-848.

Foschini", Channel Cost of Mobility", IEEE Transactions on Vehicular Technology, Nov. 1993, vol. 42, No. 4, pp. 414-424.

Kyocera Wireless Corp.'s Third Supplemental Response to MLR's First Set of Interrogatories, pp. 1, 6-11 and Exhibit A, pp. 30-39, Mar. 15, 2007.

EP Patent Application No. 05022037.5, Official Action dated May 3, 2007, 1 page.

EP Patent Application No. 05022037.5, Official Action dated Sep. 15, 2006, 18 pages.

Canadian Patent Application No. 2,179,151, Official Action dated Apr. 5, 2005, 3 pages.

PCT International Application No. PCT/US94/14159, International Search Report dated Apr. 12, 1995, 3 pages.

PCT International Application No. PCT/US94/14159, International Preliminary Examination Report dated Mar. 25, 1996, 7 pages.

"DYNA T-A-C 6000X Universal Mobile Telephone", Motorola, Inc. 1984, Motorola 000017 thru Motorola 000022.

Automatic Roaming, Cellular Radiotelecommunications Intersystem Operations (IS-41.3 Revision B), 1992, pp. 1-59.

Data Communications, Cellular Radiotelecommunications Intersystem Operations (IS-41.5 Revision B), 1992, pp. 1-84.

"9800 X Micro Tac Cellular Telephone", Motorola, Inc. 1999, Motorola 000001 thru 000016.

Notification of Transmittal of International Preliminary Examination Report, Mailing Date Apr. 18, 1996 and Inter. Pre. Examination Report, in PCT/US94/14159, 7 pages.

Fisher, Dual Mode Mobile Unit for Next Generation Digital Narrow Channel Cellular Telephone System, AT&T Bell Laboratories, 1988, pp. 543-547.

Salgado, Spectrum Sharing Through Dynamic Channel Assignment for Open Access to Personal Communications Services, ICC '95 Seattle, IEEE, pp. 417-422, dated Jun. 18, 1995.

Canadian Patent Application No. 2179151, Official Action dated May 18, 2004, 5 pages.

European Patent Application No. 95 908 417.92412, Official Action dated Sep. 16, 2003, 10 pages.

European Patent Application No. 95 908 417.92412, Official Action dated May 3, 2004, 4 pages.

Prospective Licensee Invalidity Claim Charts (15 pages), issued date Oct. 17, 2000.

PCT Search Report for PCT/SE96/01113, dated Jan. 14, 1997, 2 pages.

Supplementary European Search Report for EP 95 90 8417, dated Jun. 18, 1999, 2 pages.

Office of the Telecommunications Authority, "Telecommunications Standards Advisory Committee Working Group on New Standards and Policy (NSP)" Cordless Telephone Standards, NSP WG Paper No. 1/99, Feb. 1999, 6 pages.

Expert Report of Dr. Donald C. Cox, from Case No. 2:08-CV-357, HCM/FBS, in U.S. District Court for the Eastern District of VA, Norfolk Division, 487 pp.

Exhibit 1 to the Expert Report of Dr. Cox.

Exhibit 2 to the Expert Report of Dr. Cox.

Exhibit 3 to the Expert Report of Dr. Cox.

Exhibit 4 to the Expert Report of Dr. Cox.

Exhibit 5 to the Expert Report of Dr. Cox.

Exhibit 6, Part 1, to the Expert Report of Dr. Cox.

Exhibit 6, Part 2, to the Expert Report of Dr. Cox.

Exhibit 6, Part 3, to the Expert Report of Dr. Cox.

Exhibit 6, Part 4, to the Expert Report of Dr. Cox.

Exhibit 7 to the Expert Report of Dr. Cox.

* cited by examiner

TIERED WIRELESS, MULTI-MODAL ACCESS SYSTEM AND METHOD

This application is a continuation of application Ser. No. 11/050,776, filed Feb. 7, 2005, which is a divisional of application Ser. No. 09/813,165, filed Mar. 21, 2001 (U.S. Pat. No. 6,961,584), which claims the benefit of Provisional application Ser. No. 60/191,121, filed Mar. 22, 2000.

FIELD OF THE INVENTION

This invention relates to the field of wireless communication and more particularly to methods and apparatus relating to wireless access to telecommunication infrastructure and services.

BACKGROUND OF THE INVENTION

For a number of years, telecommunication systems have been evolving from a vast array of disparate independent networks into a single interconnected telecommunication grid including one way and two way systems such as public telephone systems, private PBS systems, cable networks, internet trunklines, local area networks, broad area networks and many types of wireless systems including specialized microwave, satellite, cellular, PCS, Specialized Radio, television, radio, etc. The isolation of these systems one from another is disappearing as the broadcast television signals are now offered over cable and satellite links, telephone connections are made over the internet, most local and broad area networks are connected via modems to public telephone networks and to the internet, cable systems are providing telephone and internet connections, the internet is supplying radio, telephone and other supplemental telecommunication services. The type of information flowing over this grid includes various types of voice/music (in both analog and digital form) data including numeric, textual and graphic (again in both analog and digital form). Traditional distinctions between these systems and the distinction in type of information conveyed is also disappearing. For example, two way interactive terminal boxes are converting conventional cable TV systems into gateways to the internet and alternatives to telephone and other two way communication systems.

Integrative technologies have become available that will allow users, of certain types of wireless networks, automated access to any one of the available wireless services without requiring conscious effort by the user. For example, U.S. Pat. No. 5,854,985 describes an omni-modal wireless access device that allows automated access to any one wireless network based on a user programmed criteria for selecting the service that best meets the user's needs. The concepts disclosed in the '621 patent are being broadly adopted in modern cellular handsets commonly referred to as multi-mode, multi-band phones because they are able to access anyone of a plurality of available wireless networks using different frequencies (multi-band) and different communication protocols (multi-mode—AMPS, TDMA, CDMA, GSM, etc.). Most of these types of phones can be set to operate in an automated mode in which it will automatically search among the available wireless network for the one that best meets a pre-programmed criteria entered by the user into the handset, such as a priority list instructing the handset, when service is requested by the user, to search among the available wireless networks for the network that appears highest on a prioritized list of networks created by the user and to access that network.

Re-allocation of scarce radio spectrum through reassignment of wireless users to disparate systems has been suggested but will require the wide adoption of omni-modal wireless access devices of the type described in the '985 patent. Automated re-allocation is described in a separate patent (U.S. Pat. No. 5,761,621) granted to the same assignee as this invention and in U.S. Pat. No. 5,805,633 and issued to Telefonaktiebolaget L M Ericsson. Such access devices and spectrum sharing methods will have the effect of further integrating the telecommunication infrastructure that links humans to one another and to sources of information, entertainment and various goods and services. At the same time, this integrative technology will greatly expand the capacity of the radio spectrum to handle the ever growing demand for information flow over the finite radio spectrum.

SUMMARY OF THE INVENTION

While the '621 and '985 patents disclose concepts that provide some simplification in accessing certain telecommunication services, the concepts disclosed in these patents do not go far enough in making the entire range of telecommunications systems and services available with a minimum of effort nor do these systems and methods provide for automated techniques for assuring that all communications (whether voice or data or whether landline or wireless) are provided in a manner that best meets the functional desires of the user such as highest speed, highest clarity, highest security, least cost, least likelihood of interruption, or other qualities or a combination of such qualities. Therefore, an urgent need exists for technology that will facilitate ease of communication, over the world wide telecommunication grid including networks not yet filly integrated, that best meets the needs of the user for the fastest, least expensive and most reliable service.

Moreover, the integrative technologies of the '621 and '985 patents do little to solve an extremely critical problem associated with realizing the full potential of modern telecommunications which is the ability to efficiently and automatically identify an individual seeking access or service over the world wide telecommunications grid. This problem is addressed by another feature of this invention by which unique identification of an individual is facilitated by providing automated unique identification which is also highly secure in that it affords little chance for unauthorized or fraudulent misuse of the system while also placing the user in full control of the process to avoid misuse by others such as governmental agencies that might abuse the user's right of privacy. Thus, an urgent need also exists for technology that facilitates unique identification of individuals who have acquired (or are seeking) access to the telecommunication grid. Only by providing unique identification in a manner than substantially eliminates the potential for unauthorized or fraudulent access can the full potential of important parts of the world wide telecommunications grid be realized, such as the full potential of the internet and e-commerce.

Among others, an important general aspect of this invention is to overcome the deficiencies of the prior art by providing cradle to grave, anytime/anywhere interlinking of human consciousness via means which maintains and respects the right of privacy of every human being to remain unique and capable of exercising free will including the freedom of thought. More particularly, an important aspect of this invention is to facilitate interlinking of human consciousness via a system that provides the user with the greatest possible interconnectedness with all other humans and with all electronically accessible knowledge without compromising the uniqueness, right of privacy, freedom of thought and free will of the user.

Another important feature of this invention will be to automate the process of uniquely identifying a human being to facilitate accessing the interlinked telecommunication grid over which human beings and organizations communicate for any purpose but particularly for securing services such as voice communication, information, entertainment, and especially financial transactions.

Still another aspect of the subject invention is to provide universal access to all available systems to allow the most economically desirable allocation of infrastructure resources and to allow automation of the log-on procedures and of procedures for transferring the communication link/service/network to achieve the most efficient allocation of scarce radio spectrum. More particularly, it is an object of the subject invention to provide a system aid method, including a business method, that is designed to harness market driven competition to promote innovation in telecommunication technology by granting ready access to the world wide telecommunications grid through efficient reallocation of scarce radio spectrum, automated unique identification of individuals, improved security and reliability of data and voice transmission, and reduced cost through greater competition and ease of introduction of new technologies.

Still another objective of this invention is to provide a personally activatable multi-modal, portable access device (which can be denoted a Universal Multi-Modal Access Device; UMMAD) which has the ability to provide omni-modal access to a broad range of wireless service networks such as those disclosed in the '985 patent or any other wireless service that may be available at a given location. Among the omni-modal capabilities of the UMMAD would be to form a wireless bridge from a subscriber to one of an array of transceiver base stations including all of the functional characteristics of a typical cellular system, fixed site base station that is dedicated to a single system but modified with augmented functionality allowing the station to provide a wide bandwidth gateway to telecommunications services via a short range, low power wireless signal link similar to that of a cordless telephone. Such base stations, with augmented functionality, would form a wide bandwidth gateway (WBG) to provide connections with the internet, PTSN, cable services, and other types of communication networks. One type of particularly desirable low power wireless link for a UMMAD would be a wireless transceiver operating in a accordance with the BLUETOOTH protocol (disclosed at www.bluetooth.com) for wireless communication of data and voice. Any other type of low power, short range wireless communication link would also be suitable.

It is still another feature of this invention to provide an auto-reconfigurable transceiver, such as a wide band gateway (WBG) that can respond to a request for service from a UMMAD within its limited service area by sending a request for linkage over its landline connection to the requested service provider and by establishing a local wireless communication channel that is both available and compatible with the capability of the UMMAD to interact with the WBG as necessary to provide to the user the requested service. In this configuration the WBG would operate much like a wall mounted cordless telephone unit by extending a communication link to the UMMAD over a communication channel determined to be available at extremely low power and using a protocol that is both consistent with the service requested and consistent with the capability of the UMMAD to interact with the WBG. As the UMMAD is moved about or as the communication channel established by the WBG is no longer operable (due to movement of the UMMAD out of range of the WBG or because the assigned channel is otherwise necessary for optimal service to another UMMAD user within the service area of the WBG), the wireless communication link would be handed off to another WBG or to a higher level wireless service station having an overlapping service area. This feature illustrates the advantage of equipping wireless service users with UMMAD type portable access devices since the interlinkage of wireless service users within a given geographic location would greatly facilitate the optimal use of the available radio spectrum and would further facilitate optimal re-allocation of scarce radio spectrum to produce the optimal level of service to the greatest number of users.

Still another feature of the subject invention is to provide various tiers of wireless service within a given geographic area such that each tier is characterized by ever greater geographic coverage so that the first tier would provide wireless service to the greatest geographic area and the last tier would provide wireless service to the smallest geographic area.

A more specific objective of this invention is to provide a wireless communication system characterized by the ability to reconnect a lost wireless connection. For example in a multi-tiered system, a wireless connection provided, for example within one tier, could have associated with it another WBG in the same or another level tier as an alternative such that upon loss of the wireless link, the user would be automatically shifted to a substitute wireless link via an alternative communication service that will have the capacity to re-establish the lost connection by (a) finding the location of the user whose call was lost, and (b) re-establishing the last connection to that UMMAD automatically through an alternative communication channel providing wireless service to the same geographic area in which the user is located. In a multi-tier system serving a population of UMMAD users, each UMMAD would be capable of interacting with any one of the tiers within a given geographic area and would be automatically transferrable either within a tier or from tier to tier depending on changes in the communication link (caused, for example by movement of the user or changes in the pattern of interference affecting the communication link) or re-allocation of the communication links to bring about a more optimal utilization of the communication networks for the greatest number of users.

A still more specific object of the subject invention is to provide a wireless communication system including WBG's as described above to create gateways to any available communication service wherein each WBG would be linked by an extremely broadband connection, such as a fiber optic cable to any communication system. Each WBG would be provided with wireless communication capability to reach all UMMAD's that may be within operative range of the WBG. With this arrangement, the various UMMAD's could be directed to communicate over the channel that provides the desired service using the most effective communication protocol via the lowest possible tier capable of completing the link to a UMMAD which in turn is capable of providing the service desired by the UMMAD user. Alternatively, the wireless communication system could use a WBG at a higher tier because that WBG is better suited to provide the type of service (most secure, highest quality, lowest price, strongest strength signal, least likely to be interrupted, etc.). Examples of the type of service that could be made available to an UMMAD over a wireless communication link from a WBG would be telephone communication, internet connection, broadcast television, cable television, radio, weather, news, sports information, airline schedules and other types of video/audio signals.

Another important aspect of this invention in terms of achieving its full potential is its ability to greatly simplify location and unique identification of individuals to allow quicker, less complicated access to electronically available services of all types. This improvement would employ a unique combination of identifiers of individual users of both a "passive" type and an "active" type.

A more specific object of the subject invention is to provide methods and apparatus for uniquely identifying individuals by a "Passive Identification" PI combined with an "Active Identification" AI. PI relies upon the fact that a human is uniquely identified by his genetic make up which may be directly measured (e.g. through DNA testing) or which is reflected in unique, measurable characteristics such as retina prints, finger prints, and other physical/functional characteristics which may be altered only with great difficulty or not at all. This type of unique human quality can be considered a "passive identifier" since no evidence of consciousness or free will is required for the human identifier to be measured. AI relies upon the fact that a human also possesses a sense of separateness or consciousness that separates him from all other humans. This characteristic finds expression in freedom of thought and in the exercise of free will which can be employed for unique identification but it requires an act of will on the part of the individual e.g. the individual is required to produce a PIN or issue a voice command. Thus this type of identification can be considered an active identifier i.e. it requires an active expression of will on the part of the human being identified.

A more specific object of this invention is to provide UMMAD's that are equipped with a PI in the form of a DNA sensor for identifying, in substantially real time, the identity of an individual. The sensor could take a variety of forms such as forming part of the UMMAD so that the UMMAD would not activate unless held by the person whose DNA is sensed by a sensor made part of the UMMAD. Alternatively, the DNA sensor could be made part of an implantable sensor that is capable of communicating with the UMMAD through electrodes, active signal, passive transponder technology or identification could occur by secondary DNA determined tests such as finger print sensing, retina scans, or other unique physical identification of the individual.

Yet another aspect of the subject invention is to provide a portable device such as a UMMAD having the capacity to become activated only when a user provides it with his unique "Passive Identifier" (PI) and his "Active Identifier" (AI), as defined above, such that a user can self activate a generic UMMAD simply by providing his unique PI and AI without requiring network activation. For example, a portable wireless access device, such as a UMMAD, designed in accordance with the subject invention would have the capacity to reconfigure itself upon receipt of a PI and AI of a subscriber. Using this feature, the user subscriber would not be required to have his own UMMAD but could use any that might be available such as one that is dispensed from a vending machine at an airport or in a supper market. There would be no need to go to a cellular equipment office for assignment of a new cellular telephone.

Still another object of this invention is to provide a system that will allow individual users to be assigned a single access identifier (personal telephone number) that would allow for automatic access to the user regardless of the location of the user. In particular, all UMMAD's would provide a continuous location indication to the nearest WBG to provide the world wide communication grid information regarding the location and accessibility of the UMMAD user. Thus, as the user moves about his home or office, only the closest WBG would announce an incoming call although the call might be answerable at any WBG through the UMMAD carried by the user. As the user enters his automobile, the nearest WBG might be a more powerful mobile cellular transceiver or WBG's located along the path of travel of the user. In the office, as the UMMAD user moves about a building, the closest WBG would communicate with the UMMAD or the UMMAD could be placed in a mode to receive all incoming calls wirelessly from the closest WBG to be answered through the UMMAD or the WBG which is the closest or becomes the closest as the user approaches the WBG for the purpose of answering the phone. The system would continually track the location of the user and route the incoming call to the user from the nearest WBG to insure that the user is alerted to an incoming call via the WBG that is best suited to meet the user's preprogrammed desires (lowest cost, greatest security, strongest signal, greatest potential for long term connection, etc.). This feature of UMMAD would provide a "follow-me" capability that would allow the world wide communication grid to locate and provide call through put to all humans who chose to carry an UMMAD having the "follow-me" capability. To avoid "big brother" aspects, each UMMAD could be equipped with a user activatable capability for disabling the "follow me" functionality in which case the calling party could be invited to leave a message or be routed to another party or destination. The capability to disable the "follow me" capability could be multi-layered including disability except for those who provide an additional access code, e.g. calls emanating from certain individuals (family members, boss, colleagues) or emanating from certain locations (home, office, friends homes, important customers, etc.) Additional layers of "follow-me" capability may be user de-activatable such as "locatability" by local law enforcement agencies except upon court order. The capacity to deactivate "locatability" could be a personal right (such as the right to privacy) except when that right has been forfeited by conviction of a crime that would otherwise subject a person to lawful imprisonment. "Follow-me" capability that is not de-activatable could become, so long as it satisfies constitutional requirements, an alternative to incarceration.

Still another object of this invention is the capability of sending an encrypted signal that is only decipherable at a network server that has been encoded with unique codes that are known solely to the UMMAD and the network server. Signals that need to be secure (such as requests for access, funds transfer orders, secure telecommunication links emanating from the UMMAD) would first be sent to the network server operated by the system service provider, decoded and sent on to ultimate destination. The network server would be empowered to effect access commands, transfer funds and carry out any other instructed functions and the network service subscriber (UMMAD owner) would be held harmless from liability.

Among the many advantages of this invention are that it would facilitate anytime, anywhere communication between all human beings who elect to be integrated into the world wide communication grid. At the same time the subject invention includes aspects that would preserve substantially the value of existing investment in wireless/landline infra-structure by allowing seamless, automated connection and transfer to the infra-structure/network most economically capable of meeting the user's needs on a real time, transparent-to-the-user, basis. Other aspects of the invention will allow users to access all available communication services including financial with a minimal amount of access hassle associated with providing access numbers, calling card numbers, personal identification numbers, or other types of unique identification processes. In addition, still other aspects of the invention will allow users to be accessed through the use of a single telephone number that allows a calling party to contact a centralized location registry which will know the location of every human who has been assigned a universal telephone number and will direct that call to the closest fixed site transceiver (WBG) for most efficiently communicating with the user.

It is another advantage of the subject invention to simplify the process of accessing communication services by allowing all calls to be initiated wirelessly and all calls to be received wirelessly wherever a user may travel. All users would have the ability to communicate with all other users who are enrolled in the system regardless of the communication service subscribed to.

Among other advantages derived from certain aspects of the disclosed invention are that it will promote price/quality/technology competition by allowing much freer access to available radio spectrum and far more efficient use of available spectrum by forming layers (tiers) of communications facilities with ever wider geographic coverage as the next tier of the system is reached. The subject invention would cause all present communication service providers now using licensed radio spectrum to have an economic incentive to participate in an ever growing degree of cooperation by which all communication services would be linked to all other communication services in a manner that would insure the most efficient use of the radio spectrum into a world-wide grid in which the first tier would consist of micro-cells in which the radio spectrum assigned would be repeated over and over but at very low power and low range to permit short range communication. The next tier would be a geographically overlapping tier to which and from which calls could be transferred to permit re-connection of lost calls or transfer of existing communications links. For example, the invention would permit adaptation to slow movement (e.g. walking) by "intra-tier" "hand-off" from one micro-cell to another and to faster movement (automobile/train-travel) by "hand-up" from micro-cell to conventional cellular (AMPS, digital TDMA, CDMA, PCS, GSM, etc) or still faster movement (e.g. plane travel) or more remote travel (e.g. ship travel) by "hand-up" to satellite communication (e.g. TELEDESIC).

The subject invention would allow communication links to be transferred automatically to the system having the greatest possibility of handling the call in accordance with the needs/desires of the user by transferring the connection link, real time, from one communication service provider to another and back again as the user's needs/circumstances (e.g. location or quality of connection) changes. Another advantage is that the invention would allow unique user identification, simplification of use, billing simplicity, security and availability. These advantages would all be achieved in varying degrees while preserving the value of existing infrastructure investment; increasing competition in technology, quality and cost; and promoting greater efficiency and use of scarce radio spectrum.

Still another advantage of he disclosed invention is that it could have real-time re-programmability of user preferences. For example, if during a call, excessive interference is experienced, a button could be pushed that would cause the UMMAD to search out another service provider who could provide a stronger signal allowing the user to be switched to the other service provider to secure a better interference free connection. Alternatively, should a caller determine that after a call has been initiated that it is important to discuss highly sensitive information requiring secure communication, the user could provide an indication to the UMMAD that the communication link should be switched to a service that would permit the communication to be encrypted for security purposes.

Other advantages include greatly simplified unique identification of individuals including unique combinations of identifiers that guarantee virtually foolproof identification (e.g.-passive/active identifiers plus encryption) organized and implemented through a portable, hand held UMMAD that allows increasingly sophisticated technology to be introduced to take advantage of existing infrastructure while providing to the ultimate user the most optimal communication linkage to the world wide telecommunications grid.

Many other objects, features, aspects and advantages of the subject invention can be appreciated by a consideration of the following Drawings and Detailed Description of the Preferred Embodiments.

DETAILED DESCRIPTION OF THE PREFERRED EMBODIMENTS

Figure 1:
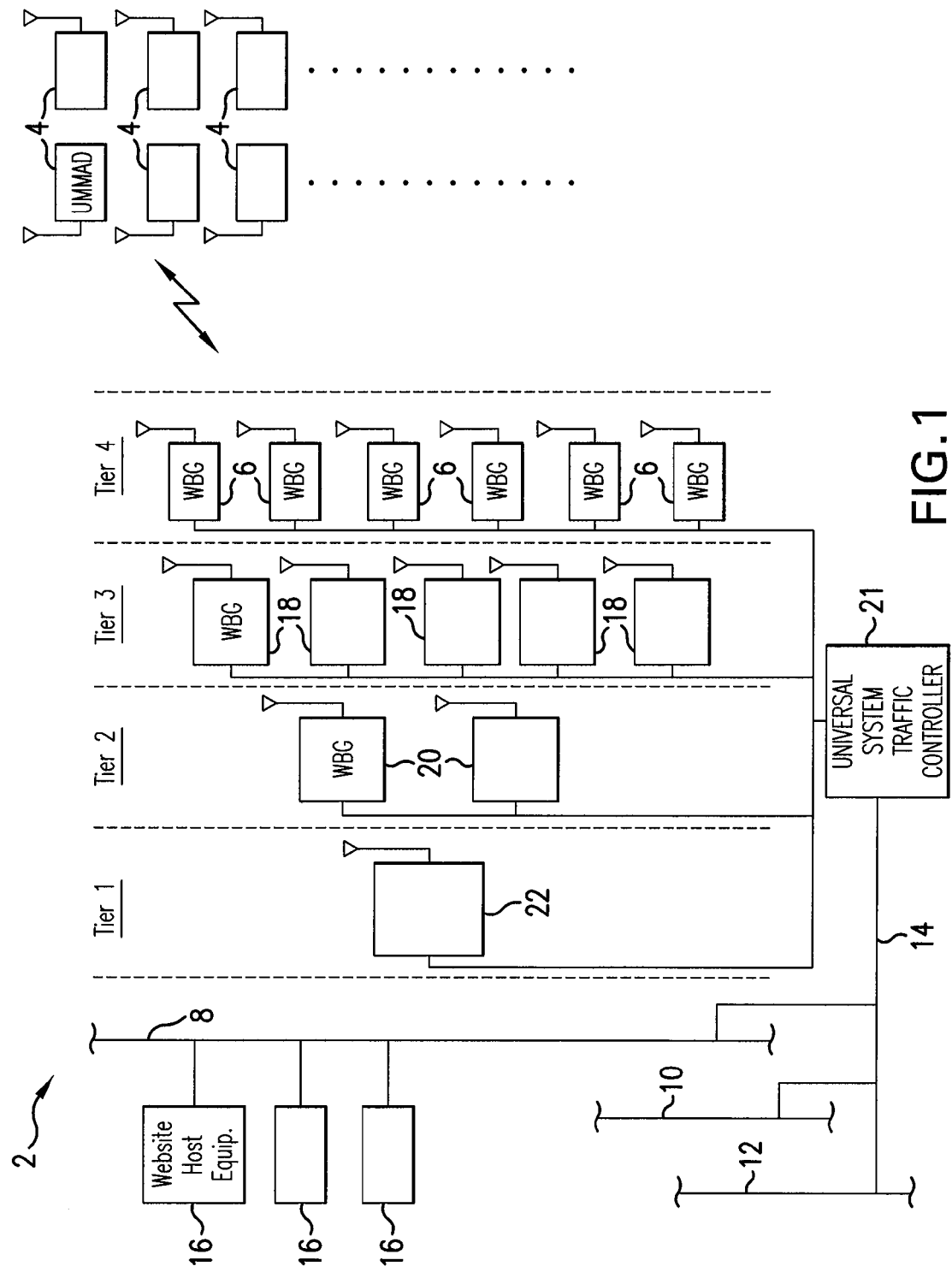
FIG. 1 is a schematic illustration of a tiered wireless, multi-modal access system designed in accordance with the subject invention.

The subject invention is designed to build on the concepts disclosed in commonly assigned U.S. Pat. Nos. '985 and '621 (the entire disclosure of which is hereby incorporated by reference) by making the entire range of telecommunications systems and services available with a minimum of effort and to provide systems and methods for automated techniques for assuring that all communications (whether voice or data or whether landline or wireless) are provided in a manner that best meets the functional desires of the user such as highest speed, highest clarity, least cost, least likelihood of interruption, highest security, or other qualities or a combination of such qualities. The subject invention satisfies the urgent need for technology that will facilitate ease of communication, over the world wide telecommunication grid, that best meets the needs of the user for the fastest, least expensive and most reliable service. FIG. 1 illustrates a highly schematic illustration of a world wide telecommunications system 2 designed and organized in accordance with the subject invention. Because the subject invention is an integrative technology, much of the grid can include existing communications networks (both landland and wireless). For example, system 2 includes a large number of personally activatable multi-modal, portable access devices 4 (which can be denoted a Universal Multi-Modal Access Device; UMMAD's) which have the ability to provide omni-modal access to a broad range of wireless service networks such as those disclosed in the '985 patent.

As will be described in more detail hereinbelow, each UMMAD 4 will include a frequency agile and protocol agile transceiver operating under digital command signals of a digital controller and memory (which stores communication protocol program sets or has the capability of receiving downloaded program sets) to allow the UMMAD 4 to access any one of a plurality of wireless networks that may be available in the geographic area within which the UMMAD 4 may be located. Because the transceiver operates under digital signal command to adjust its operating frequency and communication protocol to permit access to any available wireless network desired, the UMMAD 4 empowers its user to either manually or automatically switch from one network to another in order to obtain a desired communication service. Moreover, the UMMAD 4 may be equipped with multiple transceivers adapted specifically to wirelessly communicate in accordance with particular corresponding protocols such as the BLUETOOTH protocol described at www.bluetooth.com and adapted for low power, short distances or alternatively adapted for much greater power and distances as required for certain communication links such as satellite based communication networks. Each UMMAD would further include the capability of receiving wirelessly transmitted control signals for switching the UMMAD from one communications network to another communications network, even while a communication session, such as a telephone call or data download, is on going so that a session commenced on one network could be continued on another network as required to achieve the most economical and efficient use of available communication resources.

By providing universal access to all communication networks that may be available at a given location or area within which a UMMAD is normally moved, it will become possible to provide communication systems to allow the most economically desirable allocation of infrastructure resources and to allow automation of the log-on procedures and of procedures for transferring the communication link/service/network to achieve the most efficient allocation of scarce radio spectrum. More particularly, it is an object of the subject invention to provide a system and method, including a business method, that is designed to harness market driven competition to promote innovation in telecommunication technology by granting ready access to the world wide telecommunications grid through efficient reallocation of scarce radio spectrum, automated unique identification of individuals, and improved security of data transmission.

To achieve the result described above, system 2 is provided with an array of transceiver base stations or Wide Bandwidth Gateways (WBG) 6 which are capable of operating over a broad range of frequences and employing a range of wireless protocols. Each of the WBG's includes all of the functional characteristics of a typical cellular system, fixed site base station that is dedicated to a single system but modified with augmented functionality allowing the station to provide a wide bandwidth gateway to telecommunications services via a short range, low power wireless signal link similar to that of a cordless telephone. Such WBG's 6, with augmented functionality, would form a wide bandwidth gateway to provide connections with the Internet 8, PSTN 10, cable services 12, and other types of communication networks (not illustrated) through a communication pathway 14 which may be a landline fiber optic cable or other type of communication trunk line. Any one of these communication networks could operate to supply information to web sites through web site hosting equipment 16.

As a UMMAD moves from one location to another, the communication link can be passed from one WBG to another and/or from one communications network to another so long as the UMMAD remains within the geographic operating area serviced by the WBG to which the UMMAD remains connected. As necessary the frequency and communications protocol under which the linked together UMMAD and WBG are operating may be manually or automatically changed. All of the WBG's 6 can be grouped together to form a grid of base stations serving a defined geographic area that is made up of relatively small operating zones where lower broadcasting power can be effectively used. For example WBG's could be designed to operate at frequencies and with sufficiently low power to be essentially unregulated. This array of WBG's could thus be considered the lowest rung forming Tier 4 of the subject communications system 2. One type of particularly desirable low power wireless link for a UMMAD would be a wireless transceiver operating in a accordance with the BLUETOOTH protocol (disclosed at www.bluetooth.com) for wireless communication of data and voice. Any other type of low power, short range wireless communication link would also be suitable.

The next array of WBG's 18, forming Tier 3, is formed of WBG's having considerably greater operating power and thus much greater geographic coverage. An example of WBG's 18 would be the fixed base stations of one or more cellular systems, that is WBG's 18 may be part of one cellular network or may be the base stations of multiple different cellular networks operating at different frequencies and/or on different communications protocols. The WBG's 18 would form the next tier, Tier 3, to which a particular call could be "handed-up" as discussed in more detail below. Tier 2 would be formed by fixed site wireless base stations WBG's 20 covering still greater geographic areas operating on different frequencies normally at much greater signal strength and on differing communication protocols. Finally the first tier, Tier1, will be formed of one or more WBG's 22 that may take the form of a very wide area station such as a communication satellite.

The system 2 illustrated in FIG. 1, when fully implemented, will provide the capability of efficiently and automatically identifying individuals seeking access or service over the world wide telecommunications grid. In particular, system 2 can be operated to facilitate automated unique identification of individuals. Still more particularly the identification can occur in a manner that is highly secure in that it affords little chance for unauthorized or fraudulent misuse of the system while also placing the user in full control of the process to avoid misuse by others such as governmental agencies that might abuse the user's right of privacy. Only by providing unique identification, without substantial risk of unauthorized or fraudulent access, can the full potential of important parts of the world wide telecommunications grid, such as the full potential of the internet for e-commerce.

System 2 can be further organized to provide other important functionality such as cradle to grave, anytime/anywhere interlinking of human consciousness via means which maintains and respects the right of privacy of every human being to remain unique and capable of exercising free will including the freedom of thought. More particularly, by organizing the system properly all human consciousness can be more nearly interlinked via a system that provides users with the greatest possible interconnectedness and with all electronically accessible knowledge without compromising the uniqueness, right of privacy, freedom of thought and free will of the individual users. This additional advantage of system 2 can be achieved by affording the ability to each UMMAD 4 to uniquely identify its user as will be discussed in more detail below.

As will be described more fully below, an important part of the system illustrated in FIG. 1 is the universal system traffic controller 21. This subsystem would perform the important function of enabling a communication link established between any particular UMMAD and WBG to be switched to another communication link between the UMMAD and another WBG or the same WBG reconfigured to operated on another protocol. This could take the form of enabling (or permitting) the UMMAD to reconfigure itself to operate on a different communication channel (for example at a different frequency or range of frequencies) and/or on a different communication protocol. The details of design and operation of a practical WBG is described below.

As is well known in cellular telecommunications technology, a mobile wireless handset can be "handed-off" between fixed site base stations as a result, for example, of system load or movement of the mobile handset between geographic regions. Such hand-off can also occur to cause a data or voice communication to change frequencies over which communications are conducted. Such frequency change can occur alone or in combination with a change in the fixed site equipment servicing the call. The cellular system may implement such a hand-off through the use of a control channel separate form the channel used for data or voice communications. In such case, system control information is passed across this control channel to coordinate a change in frequency between fixed site equipment and a mobile wireless handset. In addition, where the hand-off further includes a change in the fixed site equipment servicing the communication, the communication pathway is appropriately re-routed to the newly assigned fixed site equipment to ensure seamless communications.

As noted above, each WBG 6 could include fixed cell site equipment for a single cellular communication system operating on a predetermined frequency band using a first protocol or could include equipment for a plurality of cellular communication systems operating on different frequency ranges and with different frequency protocols. In such an instance, the hand-off procedure can become more complex. That is, where a mobile wireless handset is transistioned (i.e. "handed-off") between cellular communication systems operating using differing infrastructure, the use of single control channel to coordinate the hand-off can be impossible. For example, in accordance with the present invention, a mobile wireless handset is transistioned from a first cellular communications system using, for example, a TDMA modulation protocol and operating using a first control channel for system control information to a second cellular communications system using, for example, CDMA modulation protocol and operating using a second control channel for system control information. In such case, not only must the mobile wireless handset be capable of communicating control information with the firs cellular communications system, but it must also be capable of communicating control information with the second cellular communications system. Where these system have significant differences in operation, the mobile wireless handset may have to simultaneously maintain two separate and distinct system control channels to ensure a seamless transition between the systems.

Furthermore, where the fixed cell site equipment is capable of handing-off a communication between different frequencies of fixed site equipment operating within the same cellular communications system, such equipment is not currently intended to transition such calls between differing communications systems. Furthermore, a seamless transition between such differing system is currently unknown.

In accordance with the present invention, a universal system traffic controller 21 is provided as shown in FIG. 1. The universal system traffic controller 21 operates to overcome the deficiencies noted and to seamlessly transition a communications between cellular communications systems using differing infrastructure and operating characteristics, such as modulation protocol or system control information data format. Specifically, universal system traffic controller 21 operates to receive and monitor system control information for two or more disparate communications networks and to coordinate this information between networks to seamlessly transition a communications. Universal system traffic controller 21 could independently communicate directly with a mobile wireless handset, or UMMAD 4, or could indirectly receive this information from fixed site cellular equipment operating in connection with each of two or more disparate communications networks.

In operation, universal system traffic controller 21 acts in a fashion similar to that known for single system communications, but includes cross-platform support for transition communications across differing systems. The universal system traffic controller is capable of receiving and transmitting system control information using a plurality of differing modulation frequency/protocol combinations as necessitated by the communications system being served by the traffic controller 21. Upon detection that a wireless mobile handset requires transition from one system to another, the universal system traffic controller 21 coordinates this transfer by issuing appropriate system control commands to the disparate communications systems to maintain communications with the wireless mobile handset during this procedure.

As discussed previously, the wireless mobile handset may be an omni-modal device as described in the '985 patent. This handset includes the ability to transition between one or more operating protocols and frequencies for communication. In the present invention such a handset could be employed and would operate in combination with the universal system traffic controller to transition from one communications system or network, to another communications system or network without dropping a voice or data communication.

Universal system traffic controller 21 also operates to coordinate transfer of the remote connection between communications systems as required to seamlessly maintain a communication. In other words, universal system traffic controller 21 may re-route a wireline connection from one communications system to another to facilitate the wireless transition by the wireless mobile handset. In this fashion, universal system traffic controller 21 can serve to completely transition a communication from a first communications system to a second communications system at any time such transition is considered to be appropriate.

Figure 2A:
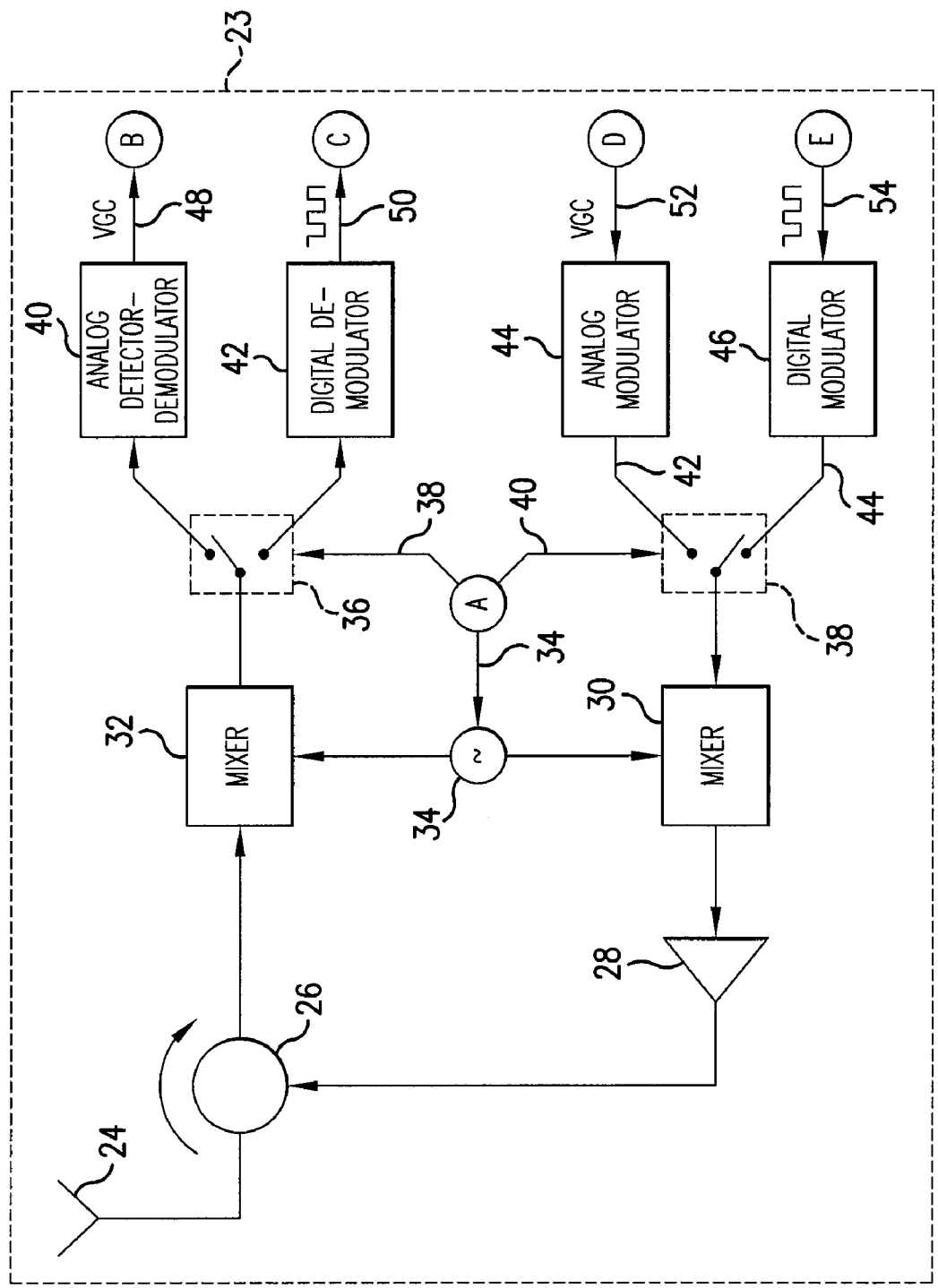
FIG. 2A is a digitally controllable multi-modal transceiver designed in accordance with the subject invention for use in the system of FIG. 1.
Figure 2B:
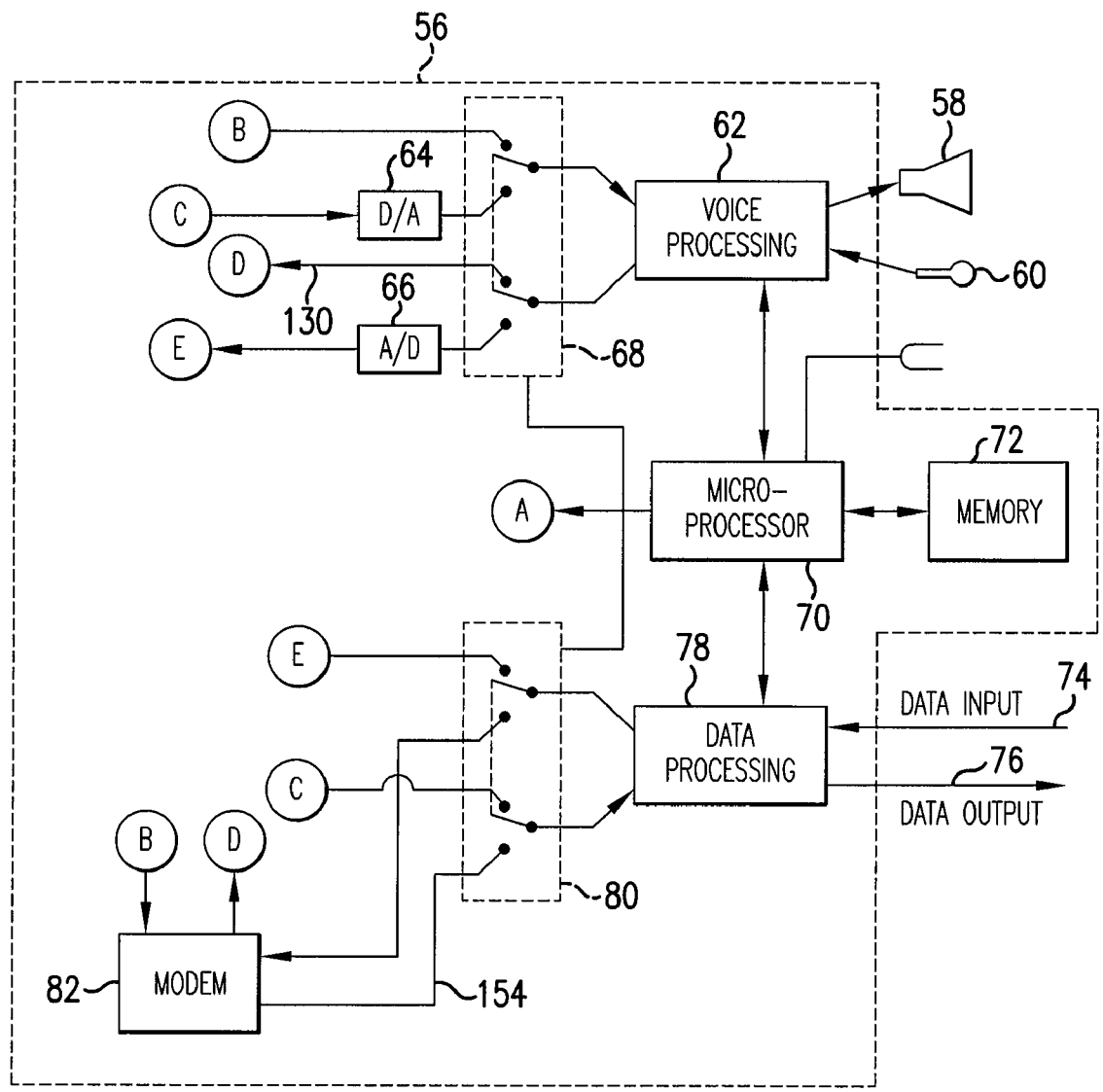
FIG. 2B is an input and control circuit for the transceiver of FIG. 2A.

Reference is now made to FIGS. 2A and 2B wherein the internal organization of a UMMAD is illustrated although many alternative arrangements would be possible depending on what combination of functions, features and advantages of the subject invention it is desired to afford to a user. More particularly FIG. 2A discloses a radio communications RF circuit 23 which has all of the same components and functional characteristics of the circuit illustrated in FIG. 1A of U.S. Pat. No. 5,854,985. More particularly, FIG. 2a includes an RF circuit having an antenna 24, diplexer 26, amplifier 28, transmit mixer 30, receiver mixer 32, programmable local oscillator 34, modulation selector switches 36 and 38, analog detector-demodulator 40, digital demodulator 42, analog modulator 44, digital modulator 46, voice grade channel output 48, digital output 50, voice grade channel input 52 and digital input 54 all of which are organized and function in accordance with the description of the '985 patent.

Similarly, the circuit of FIG. 2B discloses the input and control circuit 56 for the RF circuit 23. This control circuit includes all of the components and functional characteristics of the circuit illustrated in FIG. 1B of U.S. Pat. No. 5,854,985. More particularly, circuit 56 includes speaker 58, microphone 60, voice processing circuitry 62, digital to analog converter 64, analog to digital converter 66, first selection switch 68, microprocessor 70, memory 72, data input 74, data output 76, data processing circuit 78, second selector switch 80 and modem 82. The remaining components shown in FIG. 2B are connected and function as described in the '985 patent.

An important difference in the circuit illustrated in FIGS. 2A and 2B compared with the circuit of FIGS. 1A and 1B of the '985 patent is the way in which the microprocessor is programmed, via a program stored in memory 72, or temporarily downloaded into memory 72 via a wireless link established by the circuit of FIGS. 2A and 2B. In particular, the program is written to implement the functionality described in this description of the subject invention. In particular, the program will enable the UMMAD to reconfigure itself to operate over any one of the available wireless service networks in order to reconnect a lost communication session (voice or data) either on the same service network or over an alternative network as commanded by the Universal System Traffic Controller (USTC) 21. In particular, the USTC 21 will maintain a log of on-going communication sessions so that upon premature loss of a wireless link between a UMMAD and a wirelessly linked WBG, a communication link may be re-established either over the same network or a separate network with the same WBG another WBG in the same Tier or a WBG within another Tier. As required the UMMAD whose communication link has been prematurely disconnected can be commanded to re-configure itself to communicate through another network using a different wireless communication channel at a different frequency and using a different communication protocol in order to complete the service desired by the use, e.g. voice communication, data transfer, geo-position signaling, control function updating, etc. Moreover, as described more fully below, the program within memory 72 may operate to recognize signals provided over a control channel set up by the program to receive, process and act upon commands provided to the UMMAD whereby communication links can be transferred from one wireless service to another wireless service Thus, each UMMAD would include the capability to auto-reconfigure its transceiver, to be compatible with the wide band gateway (WBG) to which it is linked so that it can respond to a request for service from a UMMAD within its limited service area by sending a request for linkage over its landline connection to the requested service provider and by establishing a local wireless communication channel that is both available and compatible with the capability of the UMMAD to interact with the WBG as necessary to provide to the user the requested service. In this configuration the WBG would operate much like a wall mounted cordless telephone unit by extending a communication link to the UMMAD over a communication channel determined to be available at extremely low power and using a protocol that is both consistent with the service requested and consistent with the capability of the UMMAD to interact with the WBG. As the UMMAD is moved about or as the communication channel established by the WBG is no longer operable (due to movement of the UMMAD out of range of the WBG or because the assigned channel is otherwise necessary for optimal service to another UMMAD user within the service area of the WBG), the wireless communication link would be handed off to another WBG or to a higher level wireless service station having an overlapping service area. This feature illustrates the advantage of equipping wireless service users with UMMAD type portable access devices since the interlinkage of wireless service users within a given geographic location would greatly facilitate the optimal use of the available radio spectrum and would further facilitate optimal re-allocation of scarce radio spectrum to produce the optimal level of service to the greatest number of users.

A special advantage of creating UMMADs having the capabilities discussed in relation to the circuits of FIGS. 2A and 2B are that they would be able to be switched from one Tier to another as illustrated in FIG. 1. As noted above, the various tiers of wireless service serving a given geographic area could be arranged so that successive tiers could serve ever greater geographic areas so that the first tier would provide wireless service to the greatest geographic area and the last tier would provide wireless service to the smallest geographic area. For example in a multi-tiered system, a wireless connection provided, for example within one tier, could have associated with it a higher level tier as an alternative such that upon loss of the wireless link, the user would be automatically shifted to a substitute wireless link via an alternative communication service that will have the capacity to re-establish the lost connection by (a) finding the location of the user whose call was lost, and (b) re-establishing the last connection to that person automatically through an alternative communication channel providing wireless service to the same geographic area in which the user is located. In a mult-tier system having a population of UMMAD users, each UMMAD would be capable of interacting with any one of the tiers within a given geographic level and would be automatically transferrable either within a tier or from tier to tier depending on changes in the communication link (caused, for example by movement of the user or changes in interference pattern affecting the communication link) or re-allocation of the communication links to bring about a more optimal utilization of the communication networks for the greatest number of users.

Another important aspect of the subject invention is that each of the WBG's as described would be designed to create gateways to any available communication service wherein each WBG would be linked by an extremely broadband connection such as fiber optic cables 9 illustrated in FIG. 1. Each WBG would be provided with wireless communication capability to reach all UMMAD's that may be within operative range of the WBG. With this arrangement, the various UMMAD's could be directed to communicate over the channel that provides the desired service using the most effective communication protocol via the lowest possible tier capable of completing the link to a UMMAD which in turn is capable of providing the service desired by the UMMAD user. Alternatively, the wireless communication system could use a WBG at a higher tier because that WBG is better suited to provide the type of service (most secure, highest quality, lowest price, strongest strength signal, least likely to be interrupted, etc.). Examples of the type of service that could be made available to an UMMAD over a wireless communication link from a WBG would be telephone communication, internet connection, broadcast television, cable television, radio, weather, news, sports information, airline schedules and other types of video/audio signals.

The configuration of a WBG would be similar to existing fixed site, base stations for servicing wireless networks having a transceiver designed to operate at the frequency and using the communication protocol appropriate for the wireless network, eg. AMPS, TDMA, CDMA, GSM etc. Each WBG however would have the capacity to switch a wireless communication channel or call to a different system. This function could be accomplished by providing a frequency agile, protocol agile transceiver operable under digital control to switch from one communication protocol to another utilizing circuitry of the type disclosed in U.S. Pat. No. 5,854, 985. Alternatively, each WBG could be equipped with separate transceivers appropriate for each wireless network to service all UMMAD's within the relevant geographic area served by the WBG and capable of communicating using the corresponding protocol.

As is illustrated in FIG. 1, all WBG's would be connected by landline or wireless communication channel to a Universal System Traffic Controller 21.

Dynamic Auto-Reconfigurable WBG's and UMMADS

To achieve the most efficient utilization of scarce radio spectrum and to maximize the communication capability of existing telecommunication infra structure, the following capabilities could to be built into interactive reprogrammable UMMAD'S and compatible high bandwidth WBG's as described above but modified to provide additional functionality as described below. More particularly, the individual UMMAD'S would be built with the capability of being reconfigurable in terms of frequency agility and protocol agility to communicate utilizing any existing wireless service available in a given geographic location. The necessary data set needed to access this service could be resident in the portable UMMAD or could be made available via a wireless download of the protocol from the wireless service using a standardize/ dedicated communication/control channel and/or from a second traffic managing portal having general traffic controlling functions. Once configured to allow for optimal communication the communication link could be modified by change in the user's desires, location or external communication conditions or alternatively, the traffic managing portal could cause the UMMAD'S to be reconfigured based on shifts in overall demands made on the telecommunications infrastructure under management by the portal controller. The reconfiguration of the various systems would be based on the following considerations:

The capacity of a given UMMAD to be switched to a more suitable frequency and/or protocol via a resident capability or re-configureability from downloading of data sets from the WBG or another WBG under the control of the first WBG, Changes in the type of service desired by the user based on changes in location, type of service needed, external conditions (weather etc)

Changes in aggregate demand placed on the telecommunication infrastructure serving a given region that require reallocation of communication links to provide additional capacity in certain types of communication to best satisfy the aggregate demand in accordance with a predetermined hierarchy involving (1) public safety, (2) governmental function, (3) high cost/revenue security channels, (4) etc Capability of the managing WBG to control the existing infra-structure or shift presently connected UMMAD's to another wireless service provider in order to increase total system capacity.

Taking control of the "last mile" connection is the essence of this system's capabilities. This control is effected via reallocation and maximum utilization of wireless connections to provide individuals with access to the desired service via the nearest WBG having the existing capability or reconfigurable capability to service the UMMAD user given its capabilities or reconfigurable capability.

The Bluetooth type of wireless communication can be implemented at varying levels. For example the protocol can be implemented to untether devices by replacing cables with a wireless link. On a more complex level the BLUETOOTH wireless link may be used to provide a universal bridge to existing data networks, a peripheral interface, and a mechanism to form small private ad hoc groupings of connected devices away from fixed network infrastructures. BLUE-TOOTH technology is described extensively at www.bluetooth.com and the information described therein is incorporated by reference.

Another important aspect of this invention in terms of achieving its full potential is its ability to greatly simplify location and unique identification of individuals to allow quicker, less complicated access to electronically available services of all types. This improvement would employ a unique combination of identifiers of individual users of both a "passive" type and an "active" type. For example each UMMAD could be provided with apparatus for uniquely identifying individuals by a "Passive Identification" PI combined with an "Active Identification" AI. PI relies upon the fact that a human is uniquely identified by his genetic make up which may be directly measured (e.g. through DNA testing) or which is reflected in unique, measurable characteristics such as retina prints, finger prints, and other physical/functional characteristics which may be altered only with great difficulty or not at all. This type of unique human quality can be considered a "passive identifier" since no evidence of consciousness or free will is required for the human identifier to be measured. AI relies upon the fact that a human also possesses a sense of separateness or consciousness that separates him from all other humans. This characteristic finds expression in freedom of thought and in the exercise of free will which can be employed for unique identification but it requires an act of will on the part of the individual e.g. the individual is required to produce a PIN or issue a voice command. Thus this type of identification can be considered an active identifier i.e. it requires an active expression of will on the part of the human being identified.

UMMAD's may be equipped with a PI sensor in the form of a DNA sensor for identifying, in substantially real time, the identity of an individual. The sensor could take a variety of forms such as forming part of the UMMAD so that the UMMAD would not activate unless held by the person whose DNA is sensed by a sensor made part of the UMMAD. Alternatively, the DNA sensor could be made part of an implantable sensor that is capable of communicating with the UMMAD through electrodes, active signal, passive transponder technology or identification could occur by secondary DNA determined tests such as finger print sensing, retina scans, or other unique physical identification of the individual.

A UMMAD designed in accordance with the subject invention could have the capacity to become activated only when a user provides it with his unique "Passive Identifier" (PI) and his "Active Identifier" (AI), as defined above, such that a user can self activate a generic UMMAD simply by providing his unique PI and AI without requiring network activation. For example, a portable wireless access device, such as a UMMAD, designed in accordance with the subject invention would have the capacity to reconfigure itself upon receipt of a PI and AI of a subscriber. Using this feature, the user subscriber would not be required to have his own UMMAD but could use any that might be available such as one that is dispensed from a vending machine at an airport or in a supper market. There would be no need to go to a cellular equipment office for assignment of a new cellular telephone.

UMMAD's designed as described above will allow individual users to be assigned a single access identifier (personal telephone number) that would allow for automatic access to the user regardless of the location of the user. In particular, all UMMAD's would provide a continuous location indication to the nearest WBG to provide the world wide communication grid information regarding the location and accessibility of the UMMAD user. Thus, as the user moves about his home or office, only the closest WBG would announce an incoming call although the call might be answerable at any WBG through the UMMAD carried by the user. As the user enters his automobile, the nearest WBG might be a more powerful mobile cellular transceiver or WBG's located along the path of travel of the user. In the office, as the UMMAD user moves about a building, the closest WBG would communicate with the UMMAD or the UMMAD could be placed in a mode to receive all incoming calls wirelessly from the closest WBG to be answered through the UMMAD or the WBG which is the closest or becomes the closest as the user approaches the WBG for the purpose of answering the phone. The system would continually track the location of the user and route the incoming call to the user from the nearest WBG to insure that the user is alerted to an incoming call via the WBG that is best suited to meet the user's preprogrammed desires (lowest cost, greatest security, strongest signal, greatest potential for long term connection, etc.). This feature of UMMAD would provide a "follow-me" capability that would allow the world wide communication grid to locate and provide call through put to all humans who chose to carry an UMMAD having the "follow-me" capability. To avoid "big brother" aspects, each UMMAD could be equipped with a user activatable capability for disabling the "follow me" functionality in which case the calling party could be invited to leave a message or be routed to another party or destination. The capability to disable the "follow me" capability could be multi-layered including disability except for those who provide an additional access code, e.g. calls emanating from certain individuals (family members, boss, colleagues) or emanating from certain locations (home, office, friends homes, important customers, etc.) Additional layers of "follow-me" capability may be user de-activatable such as "locatability" by local law enforcement agencies except upon court order. The capacity to deactivate "locatability" could be a personal right (such as the right to privacy) except when that right has been forfeited by conviction of a crime that would otherwise subject a person to lawful imprisonment. "Follow-me" capability that is not de-activatable could become, so long as it satisfies constitutional requirements, an alternative to incarceration.

UMMAD's designed in accordance with this invention could be equipped with the capability of sending an encrypted signal that is only decipherable at a network server that has been encoded with unique codes that are known solely to the UMMAD and the network server. Signals that need to be secure (such as requests for access, funds transfer orders, secure telecommunication links emanating from the UMMAD) would first be sent to the network server operated by the system service provider, decoded and sent on to ultimate destination. The network server would be empowered to effect access commands, transfer funds and carry out any other instructed functions and the network service subscriber (UMMAD owner) would be held harmless from liability.

Financial Transactions Over the Internet Facilitated by Accurate and Unique Identification of Individuals A major impediment to wide acceptance of the internet as a medium for financial transactions is the inability of individuals to inexpensively and accurately identify themselves via a system that simultaneously avoids the danger that a participating individual would be subject to fraudulent misappropriation of his assets or that would encourage coercive action against a participating individual.

Achievement of this desirable result will require solutions to a number of difficult technical problems. For example, a need exists for a portable, repeatable, unique, substantially foolproof identification of individuals at a relatively inexpensive cost. This functionality could be achieved by a providing to augmented capabilities to a UMMAD type of device. Development of a system that complies with existing UCC requirements (or obvious analogs thereof) to permit negotiable instrument, demand deposit orders to be created. For example, an UMMAD owner could take his device to a retail outlet and establish a communication link to the network service provider through a Bluetooth connection to a WBG operated by the retail outlet. The retail outlet would access the network system server through a landline connection and send both the results of the passive and/or active identifiers to the network server to secure network authentication over a separate encrypted link back to the retail outlet including identification of the UMMAD user which could be printed out to allow the user to be sure that he was accurately identified. The retailer could then request the user to authorize funds transfer to the retail outlet's bank account which the user could authorize via a non-secure link to the retail outlet WBG and simultaneously via an encrypted link to the network server which could then be transmitted to the retail outlet. Upon verification of the results from both the UMMAD server to the UMMAD and to the retail outlet via the retail portal, a transaction receipt could be printed in duplicate and signed by the user, one copy to the user and one copy to the retail outlet with a transaction number sent in encrypted form to the user for recordation in his UMMAD memory over one secure channel, and to the retail portal for recordation in the retail outlet's memory and to the receipt printer for recordation on the receipt. Via this technique, the transaction will have been properly recorded in the user's memory, in the network server's memory and on paper to be maintained by the user and the retail outlet. This same approach could be implemented via the internet for e-commerce purposes by allowing the transaction to be implemented via a personal computer that has a docking station for the UMMAD with the personal computer being the retail outlet's portal. Similarly the Personal Computer could be used to access a web site for services.

While a number of practical applications for the subject invention have been discussed above, many alternative embodiments, variations, applications and changes are apparent. In addition several practical methods of doing business based on the apparatus and methods of this invention have been disclosed above. If this invention is widely adopted, it could have profound effects on the degree to which humans can freely and easily communicate.

I claim:

1. An auto-reconfigurable, multi-modal portable access device for providing desired communication services by accessing wirelessly a telecommunication system via one of a plurality of wireless wide band gateways using a conventional cellular protocol and by communicating wirelessly with other access devices using a low power type protocol wherein each of the other access devices is similarly auto-reconfigurable, multi-modal and portable and is capable of accessing wirelessly the communication system via one of the plurality of wireless wide band gateways using a conventional cellular protocol and is capable of communicating wirelessly with the other auto-reconfigurable, multi-modal portable access devices using a low power type protocol; said portable access device comprising:

a memory unit for storing a first protocol program data set adapted to implement the conventional cellular protocol and a second protocol program data set adapted to implement the low power type protocol;

a frequency and protocol agile transceiver circuit configured to access the wireless wide band gateways and the other auto-reconfigurable multi-modal portable access devices in response to first and second command signals, respectively; and an access device controller, coupled with said memory unit and said frequency and protocol agile transceiver circuit, for providing a first command signal to said frequency and protocol agile transceiver circuit to cause said frequency and protocol agile transceiver circuit to access one of the wide band gateways using the conventional cellular protocol by implementing the first protocol program data set retrieved from said memory unit and for providing a second command signal to the frequency and protocol agile transceiver circuit to access wirelessly one or more of the other auto-reconfigurable, multi-modal, portable access devices to form an ad hoc grouping of said access devices using the low power type protocol by implementing the second protocol program data set retrieved from said memory unit whereby a desired communication service may be acquired while making the most efficient use of scarce radio spectrum and maximizing the overall communication capability of the telecommunication system.

2. An auto-reconfigurable, multi-modal portable access device as defined in claim 1, wherein said access device controller operates to establish a communication link with the closest wide band gateway or other auto-reconfigurable, multi-modal portable access device capable of providing the desired communication service while using the communication link requiring lower power and operating over a shorter range thereby achieving the most efficient utilization of scarce radio spectrum and maximizing the communication capability of the telecommunication system.

3. An auto-reconfigurable, multi-modal portable access device as defined in claim 1, wherein the low power type protocol is a Bluetooth protocol.

4. An auto-reconfigurable, multi-modal portable access device as defined in claim 1, wherein said first protocol program data set causes said transceiver circuit to operate in response to commands received from the wireless wide band gateway over a first control channel.

5. An auto-reconfigurable, multi-modal portable access device as defined in claim 4, wherein said first protocol program data set causes said transceiver circuit to operate in response to commands received from another wireless wide band gateway over a second control channel.

6. An auto-reconfigurable, multi-modal portable access device as defined in claim 4, wherein the telecommunication system is formed of plural wireless networks operating on different protocols and different frequencies accessible through different wide band gateways and wherein said memory unit stores a separate protocol program data set adapted to cause said transceiver circuit to establish a communication link with each separate wireless network using an appropriate protocol and radio frequencies.

7. An auto-reconfigurable, multi-modal portable access device as defined in claim 1 for communicating with any one of a first plurality of wireless gateways operating at low power defining a relatively small broadcast range and forming a first tier of a multi-tier communication system and for communicating with any one of a second plurality of wireless gateways capable of operating at a higher power defining a relatively larger broadcast range and forming a second tier of a multi-tier communication system, wherein said access device controller provides a first command signal in response to a communication request to cause said frequency and protocol agile transceiver to access a wireless gateway within the first tier whenever the multi-modal wireless access device is within the broadcast range of a first tier gateway and said access device controller provides a second command signal in response to a communication request to cause said frequency and protocol agile transceiver to access a wireless gateway in the second tier whenever said access device is outside the broadcast range of a wireless gateway within the first tier.

8. An auto-reconfigurable, multi-modal portable access device as defined in claim 7, wherein a communication link is formed when said frequency and protocol agile transceiver accesses a first tier wireless gateway and wherein the communication link is handed off to another first tier wireless gateway, when possible, and to a second tier wireless gateway, when necessary, to maintain the communication link as said access device moves about geographically or as other changes in the communication link occur.

9. An auto-reconfigurable, multi-modal portable access device as defined in claim 1, wherein said frequency and protocol agile transceiver circuit is adapted to receive from a wireless gateway an additional protocol program data set for storage in said memory unit, said access device controller operating to retrieve said additional protocol from said memory unit to re-configure said access device and to access a wireless gateway by executing said additional protocol program data set.

\* \* \* \* \*